US009645395B2

(12) United States Patent
Bolas et al.

(10) Patent No.: US 9,645,395 B2
(45) Date of Patent: May 9, 2017

(54) DYNAMIC FIELD OF VIEW THROTTLING AS A MEANS OF IMPROVING USER EXPERIENCE IN HEAD MOUNTED VIRTUAL ENVIRONMENTS

(71) Applicants: Mark Bolas, Los Angeles, CA (US); J. Adam Jones, Torrance, CA (US); Ian McDowall, Woodside, CA (US); Evan Suma, Culver City, CA (US)

(72) Inventors: Mark Bolas, Los Angeles, CA (US); J. Adam Jones, Torrance, CA (US); Ian McDowall, Woodside, CA (US); Evan Suma, Culver City, CA (US)

( * ) Notice: Subject to any disclaimer, the term of this patent is extended or adjusted under 35 U.S.C. 154(b) by 0 days.

(21) Appl. No.: 14/216,220

(22) Filed: Mar. 17, 2014

(65) Prior Publication Data
US 2014/0268356 A1    Sep. 18, 2014

Related U.S. Application Data

(60) Provisional application No. 61/799,758, filed on Mar. 15, 2013.

(51) Int. Cl.
*G02B 27/14* (2006.01)
*G02B 27/01* (2006.01)
*G02B 27/00* (2006.01)

(52) U.S. Cl.
CPC ....... *G02B 27/017* (2013.01); *G02B 27/0093* (2013.01); *G02B 2027/014* (2013.01);
(Continued)

(58) Field of Classification Search
CPC .............. G02B 27/0172; G02B 27/017; G02B 27/0093; G02B 2027/0178;
(Continued)

(56) References Cited

U.S. PATENT DOCUMENTS

| 4,406,532 A | 9/1983 | Howlett |
| 5,508,849 A | 4/1996 | Goodell |

(Continued)

FOREIGN PATENT DOCUMENTS

| EP | 1379082 B1 | 6/2005 |
| WO | WO2004006570 A1 | 1/2004 |

(Continued)

OTHER PUBLICATIONS

Pig Nose Disclosure by Third Party. possibly before Mar. 17, 2014.
LEEP Camera, possibly demonstrated before Mar. 17, 2014.
(Continued)

*Primary Examiner* — Tuyen Tra
(74) *Attorney, Agent, or Firm* — McDermott Will & Emery LLP

(57) ABSTRACT

A head-mounted display (HMD) allows a user to view a virtual environment. The HMD displays a field of view to the user. However, the user may experience simulator sickness or motion sickness from viewing the field of view. The HMD is connected to a sensor which can monitor the user. By monitoring the user's physiological state, the user's simulator sickness can be detected or predicted. To reduce the negative effects, the field of view can be throttled. The field of view can also be throttled in order to provide a better user experience even if the user does not experience sickness.

17 Claims, 5 Drawing Sheets

(52) U.S. Cl.
CPC .............. *G02B 2027/0123* (2013.01); *G02B 2027/0178* (2013.01); *G02B 2027/0187* (2013.01)

(58) Field of Classification Search
CPC ...... G02B 2027/0123; G02B 2027/014; G02B 2027/0187
USPC .......... 359/630, 629, 618, 13, 376, 458, 462; 345/8, 7
See application file for complete search history.

(56) References Cited

U.S. PATENT DOCUMENTS

| | | | |
|---|---|---|---|
| 8,212,859 | B2 | 7/2012 | Tang et al. |
| 8,708,884 | B1* | 4/2014 | Smyth ................. A61M 21/00 600/27 |
| 8,957,835 | B2 | 2/2015 | Hoellwarth |
| 9,293,079 | B2 | 3/2016 | Bolas et al. |
| 2002/0019296 | A1* | 2/2002 | Freeman ................ A63F 13/02 482/4 |
| 2002/0099257 | A1* | 7/2002 | Parker et al. .................. 600/27 |
| 2010/0079356 | A1 | 4/2010 | Hoellwarth |
| 2012/0094754 | A1 | 4/2012 | Suzuki et al. |
| 2012/0135803 | A1 | 5/2012 | Nonaka et al. |
| 2013/0113973 | A1 | 5/2013 | Miao |
| 2013/0141360 | A1 | 6/2013 | Compton et al. |
| 2014/0139551 | A1* | 5/2014 | McCulloch ............ G09G 5/377 345/633 |
| 2014/0267637 | A1 | 9/2014 | Hoberman et al. |
| 2015/0355465 | A1 | 12/2015 | Jones et al. |

FOREIGN PATENT DOCUMENTS

| | | |
|---|---|---|
| WO | WO2004006578 A1 | 1/2004 |
| WO | WO2005041568 A1 | 5/2005 |
| WO | WO2005069638 A1 | 7/2005 |
| WO | WO2005069640 A1 | 7/2005 |
| WO | WO2006003600 A1 | 1/2006 |
| WO | WO2006003603 A1 | 1/2006 |
| WO | WO2006003604 A1 | 1/2006 |
| WO | WO2006003624 A1 | 1/2006 |
| WO | WO2012035174 A1 | 3/2012 |

OTHER PUBLICATIONS

Sutherland, I.E. 1965 The Ultimate Display. In Proceedings of IFIP Congress, International Federation for Information Processing, London: Macmillan and Co., 1965, pp. 506-508.
Sutherland, I.E. 1968 A Head-Mounted Three Dimensional Display. In AFIPS '68 (Fall Joint Computer Conference), Dec. 9-11, 1968, New York, NY: ACM, pp. 757-765.
hasbroMY3D.com.2010. Product Guide to MY3D App. Hasbro, 3 pages.
USPTO. 2015. Non-final Office Action dated Dec. 4, 2015 for U.S. Appl. No. 14/211,459, entitled "Head-Mounted Display Frame for Improved Spatial Performance in Head Mounted Virtual Environments," filed Mar. 14, 2014, published as U.S. PG Pub 2015/0355465 A1.
USPTO. 2016. Non-final Office Action dated Apr. 8, 2016 for U.S. Appl. No. 14/216,143, entitled "Hybrid Stereoscopic Viewing Device," filed Mar. 17, 2014, published as U.S. PG Pub 2014/0267637 A1.
USPTO. 2016. Final Office Action dated Jun. 20, 2016 for U.S. Appl. No. 14/211,459, entitled "Head-Mounted Display Frame for Improved Spatial Performance in Head Mounted Virtual Environments," filed Mar. 14, 2014, published as U.S. PG Pub 2015/0355465 A1.
Non-Final Office Action dated Feb. 10, 2017, which issued in U.S. Appl. No. 14/211,459.
Notice of Allowance dated Jan. 31, 2017, which issued in U.S. Appl. No. 14/216,143.

* cited by examiner

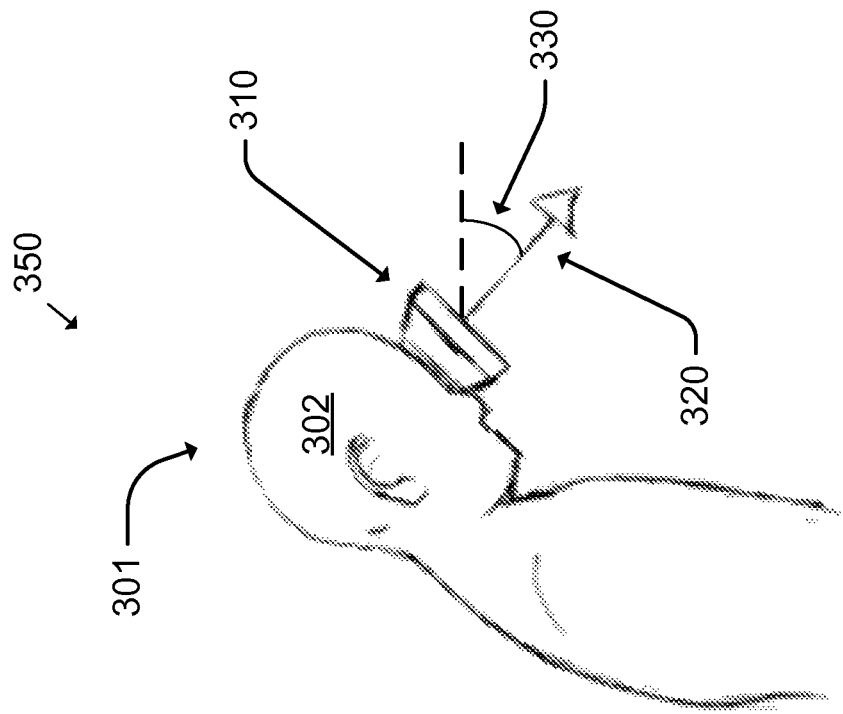
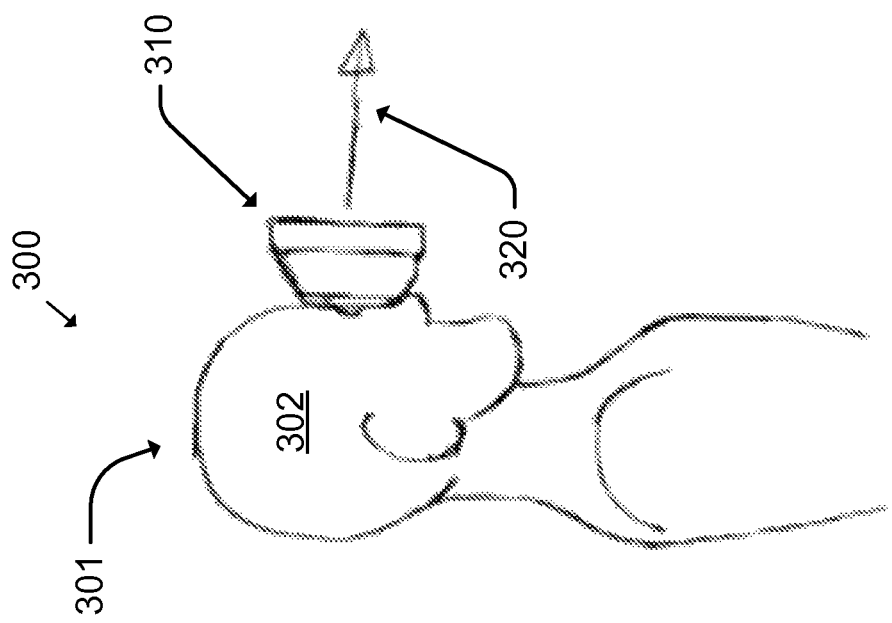
FIG. 3B
FIG. 3A

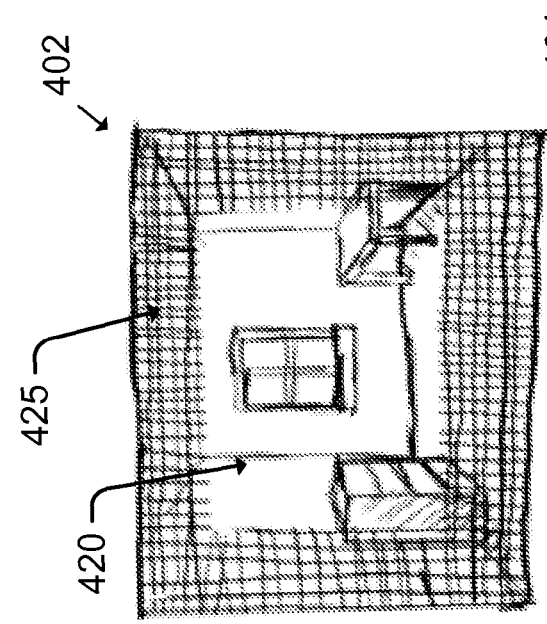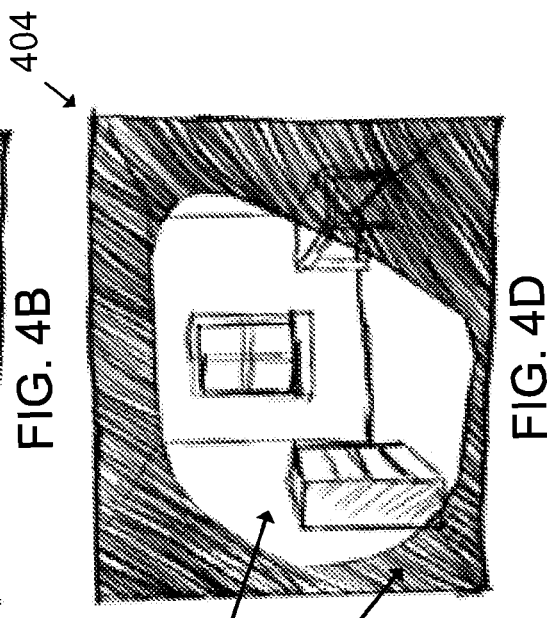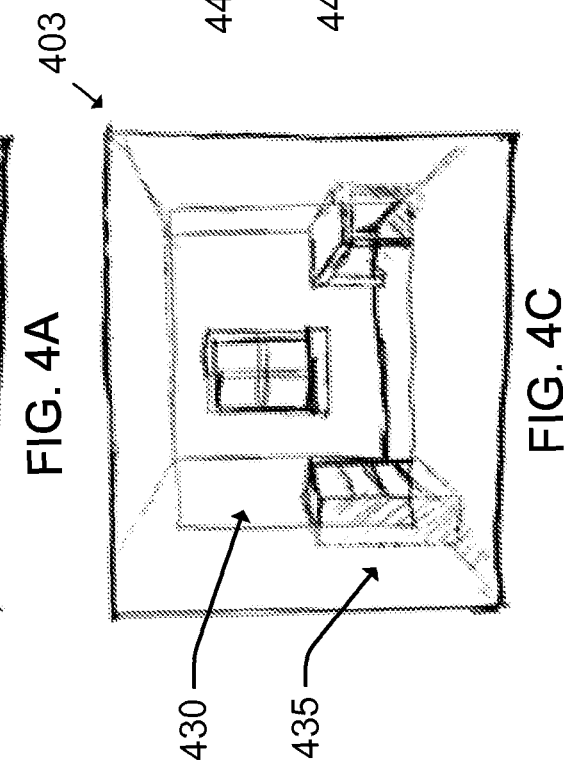

DYNAMIC FIELD OF VIEW THROTTLING AS A MEANS OF IMPROVING USER EXPERIENCE IN HEAD MOUNTED VIRTUAL ENVIRONMENTS

CROSS-REFERENCE TO RELATED APPLICATION

This application is based upon and claims priority to U.S. provisional patent application 61/799,758 entitled "Dynamic Field of View Throttling as a Means of Improving User Experience in Head Mounted Virtual Environments" filed Mar. 15, 2013, the entire content of which is incorporated herein by reference.

STATEMENT REGARDING FEDERALLY SPONSORED RESEARCH

This invention was made with government support under Grant No. W911 NF-04-D-0005, awarded by the Army Research Office (ARO). The government has certain rights in the invention.

BACKGROUND

Technical Field

This disclosure relates to head mounted displays for viewing virtual environments.

SUMMARY

Various factors within the field of view of a head-mounted display (HMD) may affect the user in ways that may cause one to experience simulator sickness or motion sickness. Some of these factors are related to virtual movement that may not be congruent to the user's actual movement. Others are related to the inaccurately rendered periphery, jitter in tracking, or delays in the refresh of the graphics. Many of these may be mitigated by restricting, expanding, or blurring regions of the visible area of the virtual environment being viewed in the HMD. Additionally, such manipulations can also influence the aesthetic qualities of the virtual scene or impact various aspects of the user's experience, performance, and behavior.

According to the present disclosure, the field of view as seen by a user of a virtual environment is dynamically throttled or restricted in real time in order to mitigate such simulator or motion sickness or to influence the user's experience or behavior in the virtual environment. The amount of restriction can be controlled based on a number of variables.

In one implementation, a non-transitory, tangible, computer-readable storage medium containing a program of instructions causes a computer system running the program of instructions to display, on a display of the computer system, a field of view (FOV) of a virtual environment. The computer system also detects, using a sensor configured to monitor a user state in response to viewing the FOV, the user state, and manipulate the FOV based on the user state.

In another implementation, a method of displaying a virtual environment comprises displaying, on a stereoscopic display, a field of view (FOV) of a virtual environment, determining, based on historical data and a current user physiological state, a visual alteration to the FOV, and rendering, on the stereoscopic display, the visual alteration to the FOV.

In yet another implementation, a virtual environment viewing device comprises a sensor for detecting physiological parameters, and a stereoscopic display connected to the sensor and configured to display a field of view (FOV) of a virtual environment, wherein the FOV is visually altered based on the physiological parameters.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3A illustrates a user pose of a normal state when experiencing a virtual environment in a head-mounted display according to example aspects of the present disclosure.

FIG. 3B illustrates the user of FIG. 3A in a user pose indicating an abnormal state according to example aspects of the present disclosure.

FIG. 4A illustrates field of view restriction using opaque polygons according to example aspects of the present disclosure.

FIG. 4B illustrates field of view restriction using a screen mesh pattern according to example aspects of the present disclosure.

FIG. 4C illustrates field of view restriction using a blur effect according to example aspects of the present disclosure.

FIG. 4D illustrates field of view restriction using an asymmetric aperture according to example aspects of the present disclosure.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

The present disclosure describes graphical elements rendered in software to restrict or modify the rendered field of view (FOV) in a head mounted virtual environment. A head mounted display (HMD) includes a display that is seen through optics. The optics focuses the display onto the user's eyes such that the field of view is mapped to the user's natural field of view. As the user moves, trackers in the HMD allow detection of the yaw, pitch, and roll of the HMD, corresponding to the user's movements, to accordingly update the field of view of the virtual environment. In one implementation, the field of view is restricted using a graphically rendered occluding aperture consisting of opaque polygons that are drawn in front of the view of the remaining environment.

Figures 1A, 1B:
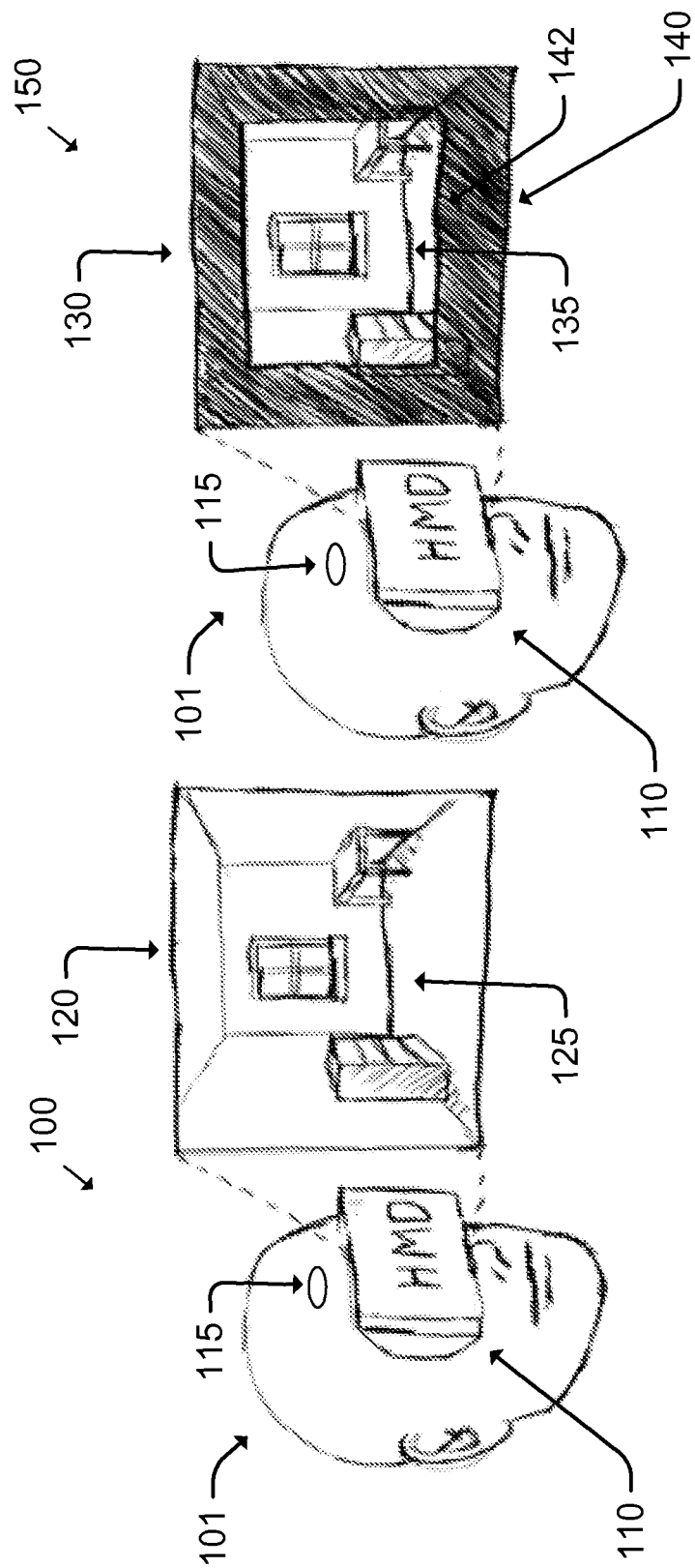
FIG. 1A illustrates a user viewing a virtual environment through a head mounted display according to example aspects of the present disclosure.
FIG. 1B illustrates the user of FIG. 1A viewing the same virtual environment with the field of view restricted according to example aspects of the present disclosure.

FIG. 1A illustrates an implementation of a head mounted display environment 100. A user 101 views a virtual environment 120 through an HMD 110. The HMD 115 may be a virtual environment viewing device having a stereoscopic display, and may be attachable to the user 101, or may be a head coupled display which can be placed near the user's eyes. The virtual environment 120 is graphically rendered with a certain field of view (FOV) 125, which is determined by the specific hardware specifications of the HMD. A sensor 115 is attached to the user 101, although in other implementations there may be additional sensors at additional locations, such as elsewhere along the user's body, or integrated with the HMD 110. For example, one or more sensors 115 may be integrated within a portion of the HMD 110 which contacts the user 101. The sensor 115 may wirelessly transmit data to the HMD 110 or other connected computer system, or alternatively can be connected through a cable or wire or otherwise configured to transmit data. The sensor 115 is configured to detect various parameters of the user's state, as described below. For example, a heart rate sensor may be used to detect fluctuations in the user's physiological state, which may be an early indicator of motion sickness. Alternatively, an electroencephalographic (EEG) sensor could be used to detect fluctuations in the user's cognitive state. These examples are illustrative, as other sensors may be used to monitor user state or environmental parameters, including both physical hardware devices and software measurements, depending on the goals of the application. The FOV 125 is not restricted or otherwise modified. To implement an occluding aperture, a series of connected polygons is rendered that form an occluding plane with a central window through which the virtual environment 120 can be seen. For example, FIG. 1B illustrates a head mounted display environment 150, including the user 101 viewing, through the HMD 110, a virtual environment 130, which may represent the same virtual environment. An FOV 135 appears restricted compared to the original or unrestricted FOV 125, due to an occluding plane 140 with an aperture 142. This window or aperture 142 can then be graphically scaled by performing geometric transforms standard to all computer graphics interfaces as a means of provide larger or small fields of view into the virtual environment. These parameters (aperture size, opacity, color, blurring, texturing, etc.) can be modulated based on a number of parameters, including measurements from the sensor 115, as further described below. The method could also utilize semi-opaque, colored, blurred, or textured polygons as an alternative to complete opacity. The polygons or other techniques described here could also be used to represent virtual objects in front of, attached to, or following the user's head in the virtual environment.

Figure 2A:
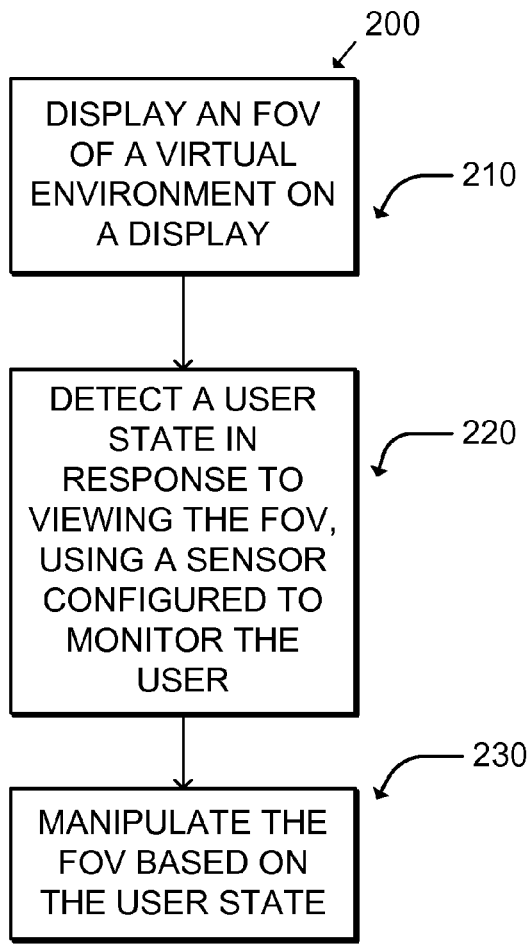
FIG. 2A-B illustrate a flow chart for field of view throttling according to example aspects of the present disclosure.

The FOV may be modified through throttling, which refers to dynamically restricting the visible portion of the field of view as seen by a user of a virtual environment in real time. FIG. 2A illustrates a flowchart 200 of an example method of throttling.

At 210, an FOV, such as the FOV 125, of a virtual environment, such as the virtual environment 120, is displayed on a display, such as the HMD 110. By default, the virtual environment is displayed using the full field of view supported by the head mounted display.

At 220, a current user state is detected in response to viewing the FOV, using a sensor, such as the sensor 115, configured to monitor the user. For example, the sensor may detect an abnormal physiological state, including various forms of sickness, or an expected abnormal physiological state, such as an expected or predicted sickness. At 230, the FOV is manipulated based on the user state. For example, the FOV may be throttled or otherwise visually altered to mitigate or remedy the effects of the abnormal physiological state, or to prevent the expected abnormal physiological state. The throttling or visual alterations may be determined or selected based on the current user state, as detected by the sensor, and historical data which may correlate to physiological states or other parameters as described below. The HMD may continuously render the display, and the sensor may be continuously monitoring the user, such that the FOV may be dynamically and continuously manipulated. The HMD, or another communicatively connected computer device, may further have historical data to determine when an expected abnormal physiological state is detected.

Figure 2B:
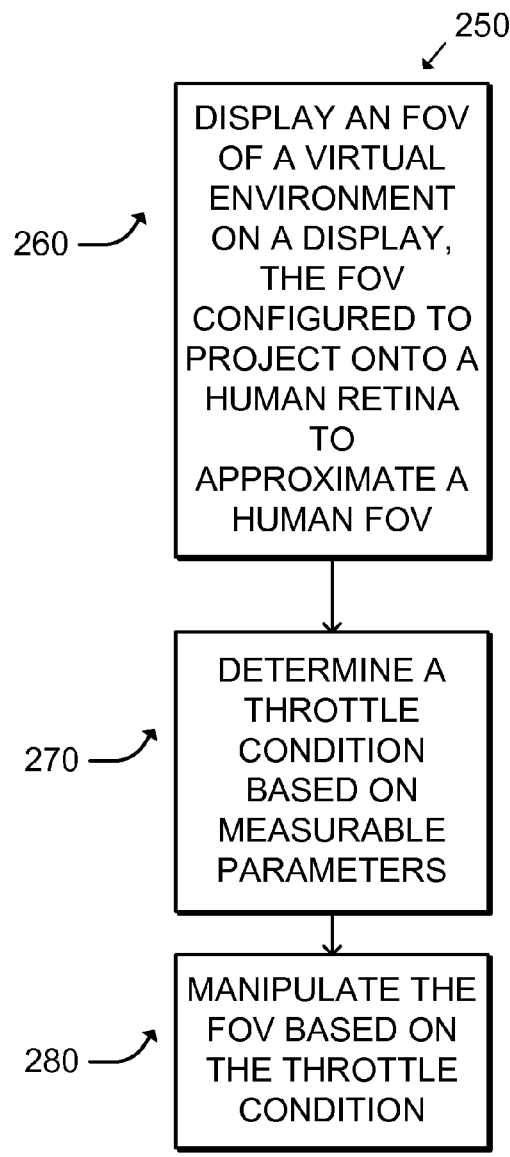

FIG. 2B illustrates a flowchart 250 of another example method of throttling. At 260, an FOV of a virtual environment is displayed on a display. The FOV is configured to project onto a human retina to approximate a human FOV. In other words, the FOV maps onto the human FOV to approximate a 1-1 relationship. At 270, a throttle condition based on measurable parameters is determined. The throttle condition may be based on sensors, as described herein, or other phenomena as described herein. At 280, the FOV is manipulated based on the throttle condition. The FOV may be restricted, as described herein.

When a particular user state is detected (determined by a number of possible parameters), throttling is engaged, resulting in an artificially restricted field of view. When the state is no longer detected, the original field of view may be restored, either substantially instantaneously or gradually over time. The field of view can be throttled based on a number of parameters, such as the severity and manner of sickness experienced by the user, the likelihood of expected sickness in the future, the motions and behavior of the user, the user's physiological state, the user's cognitive or emotional state, the user's prior experiences, the user's performance of a specific task, the user's personal preferences, technical hardware or software performance, characteristics of the virtual scene, the amount of time in the virtual environment, and so forth, which may be detected by one or more sensors monitoring the user, user inputs, or other metrics and inputs.

Various factors within the field of view of a virtual environment affect the user in ways that may cause one to experience simulator sickness or motion sickness. Some of these factors are related to virtual movement that may not be congruent to the user's actual movement. Others are related to the inaccurately rendered periphery, jitter in tracking, or delays in the refresh of the graphics. Many of these can be mitigated by restricting, expanding, or blurring the visible area within a virtual environment. Therefore, the field of view as seen by a user of a virtual environment may be dynamically throttled in order to mitigate such simulator or motion sickness. In one implementation, throttling can be employed in response to observed symptoms, which may be determined by taking physiological measurements, observing changes in body posture or behavior, self-reports, or through other means using one or more sensors.

Biometric information such as breathing rate, sweating or perspiration measurement, skin conductance, galvanic skin response, or other physiological signals could be used as indicators of simulator sickness. Such objective measurements may be measured by a sensor and could therefore be used as a parameter for throttling the field of view.

In addition to responding directly to observed symptoms of simulator sickness, field-of-view throttling can also be used as a preventative measure to mitigate or reduce the likelihood of experiencing sickness in the future. For example, a throttled field-of-view may reduce exposure to known perceptual cues that are known to contribute to symptoms of simulator or motion sickness. Such data may be included in historical data.

For example, the likelihood of experiencing simulator sickness generally increases with longer amounts of time spent continuously immersed in a virtual environment. Therefore, in one implementation, the amount of time that has elapsed since the user entered the virtual environment is used to control the restriction. When a user first enters the virtual environment, the field of view is limited, for example, if the display's full field of view is 90 degrees, then the throttled field of view could be reduced to 40 degrees at the start of the experience. Over a period of time, the field of view is then gradually increased to the full 90 degrees. For example, the field of view may be expanded from the FOV 135 in FIG. 1B to the FOV 125 in FIG. 1A. This allows the user to acclimate to the virtual experience and could reduce the possibility of motion sickness.

The amount of time to acclimate and become comfortable with a virtual environment is likely to take less time for users that are experienced and familiar with interacting in virtual worlds, such as 3D games. Therefore, historical data including prior experience, such as self-reports on a pre-questionnaire, may be used as an input variable that controls field-of-view throttling. For example, the speed of throttling may be faster for experts and slower for novices, giving less experienced users greater time to acclimate to the experience.

Technical hardware and software performance are other parameters that could be used to control field of view throttling. For example, slow graphics rendering speeds and head tracking latency/noise are often associated with increased simulator sickness. Therefore, if rendering speeds are slow over a period of time, for example, averaging 10 frames per second over a one minute period, or any other threshold average framerate, then the field of view would gradually be reduced from the display's full field of view. If the rendering speeds later increased, for example averaging 60 frames per second, then the field of view would be increased to the full field of view. Similarly, if the tracking system that senses head orientation and/or position becomes noisy, or inaccurate, then the FOV could be reduced, until better tracking data is available.

Dynamic throttling may potentially reduce simulator sickness, but can also enhance or otherwise influence the user's experience of a virtual environment. For example, field of view throttling can be invoked as an aesthetic technique. For example, the field of view can be limited when the author of the environment wishes the user to be more focused on what is directly in front of them, such as in a battle scene. Afterwards, when the user transitions to an outdoor scene, this limited field of view could be expanded to make the virtual world feel more expansive. Alternatively, in an emotional scene, the field-of-view may be throttled to emphasize certain moments, in an attempt to increase its impact or provoke a greater response from the user.

It may be useful to dynamically throttle the field of view based on indicators of the user's cognitive state. For example, if the user appears to be confused or lost, it may be useful to temporarily expand the visible field of view to enhance spatial and situational awareness. This could be assessed by monitoring, through one or more sensors, movement through different areas of the virtual world, head motions (e.g. looking around frantically), brain or muscular activity, verbal feedback, or other factors.

The visible field of view could also be modified based upon user performance on specific tasks in a virtual environment. For example if a user is involved in competitive task (e.g. fight scene) and begins to do poorly, the field of view could be decreased to reduce distractions or enhance focus. Conversely, the field of view could be increased during tasks that require spatial or situational awareness, in order to allow greater visibility of the virtual scene.

Field of view throttling could also be employed as a reward mechanism. For example, the user's field of view may be increased as a result of successfully completing tasks in the virtual environment. In the context of a video game, this could be a visual representation of becoming stronger and gaining new abilities. Conversely, the field of view could be decreased to increase the difficulty of play or represent decreased situational awareness to represent the player becoming weaker.

While field of view throttling could be implemented entirely through automatic algorithms, it may also be useful to take the user's preferences into account. For example, the system may allow the user to select a "default" field of view that is used as a basis for automatic throttling based on other parameters. Alternatively, the user could be given direct control over the throttling parameters, either by gradually expanding/restricting the field of view at will, or by switching between multiple predefined field of view settings.

In one implementation, the field of view can be throttled based on changes in the user's motions and/or body posture. For example, one variable that could be used is a measurement of a user's average head declination, which could indicate that a user is experiencing motion sickness, as shown in FIGS. 1A and 3B.

FIG. 3A shows a first user state 300, which may correspond to a normal physiological state. A user 301 is using an HMD 310 attached to the user's head 302. The HMD 310 includes trackers or other sensors (integrated with the HMD 310 but not visible in FIG. 3A or 3B), such as accelerometers and gyroscopes, which allows a display of the HMD 310 to dynamically render scenes of a virtual environment in response to the user's head movements. The trackers may detect a horizontal orientation 320 of the HMD 310, which corresponds to an orientation of the head 302. The head tracking data from the head mounted display's tracker may be averaged over time to determine that downward bias to the horizontal orientation 320. A downward bias may indicate head declination that may be an indicator that the user 301 is experiencing simulator or motion sickness. FIG. 3B shows the head 302 drooping, or be biased downward. The HMD 310 may detect that the horizontal orientation 320 is biased downward by an angle 330. Specifically, if the tracking data from the display's head tracker indicated that the user's head 302 is consistently declined by a certain threshold, such as 10 degrees below horizontal, 20 degrees below horizontal, or other appropriate degree, the field of view may be throttled in response, such as decreasing the field of view to a smaller amount. Other measurements based on head or body tracking data could also be generated algorithmically.

FIG. 4A illustrates a virtual environment screen 401 manipulated through opaque polygons 415 to fully occlude the periphery and restrict a field of view 410. However, partial occlusion may also be used. FIG. 4B illustrates an example of partial occlusion using a textured mask 425 with a pattern of occlusion, such as partial occlusion of the periphery of a virtual environment screen 402 in a screen mesh pattern to partially restrict a field of view 420.

Visual effects that alter the appearance of certain areas of the field-of-view could also be used, such as blurring, reduction of brightness, or recoloring. For example, blur could be applied to the outer regions of the image, thus the central region can remain crisp, while the periphery would be softened. FIG. 4C illustrates a field of view restriction using a blur effect 435 that renders the peripheral region of a virtual environment screen 403 out of focus, while the central region remains sharp, to partially restrict a field of view 430. This could potentially reduce feelings of sickness or disguise unwanted visual artifacts while retaining the feeling of an expansive field of view.

A simple implementation of throttling would reduce the visible field of view equally in all directions, thereby creating a circular aperture. However, field of view restriction can also be applied unequally. For example, an oval, ellipse, rectangle, or any other arbitrary shape could be used. Additionally, it may also be advantageous to consider apertures derived from human anatomy, such as the shape created by scaling down the contour of an individual's visual field. FIG. 4D illustrates field of view restriction using an asymmetric aperture derived by scaling down the counter of the human visual field. A virtual environment screen 404 is occluded by an asymmetric frame 445, resulting in a field of view 440. Although FIG. 4D illustrates the asymmetric frame 445 as opaque, similar to the opaque polygons 415, in other implementations the asymmetric frame 445 may be rendered through other visual effects as described above. Asymmetric field of view restriction could also potentially be used to guide the user to look in a certain direction. For example, to guide the user to look or move to the left, the field of view could be less restricted on the left side as opposed to the right side. Field of view restrictions could also be used for non-head-mounted or head-coupled virtual environments. For example, applying an aperture derived from human anatomy may provide greater engagement for imagery displayed on a standard computer monitor or cinema screen. In these cases, the imagery could be based on the user's head motion or presented entirely independent of head motion.

The field of view may be restricted by rendering a series of opaque polygons in front of the camera (viewpoint) of the virtual environment, creating an aperture or frame through which the virtual world is visible. This frame can be scaled upwards or downwards using standard graphics transformations to increase or decrease the visible field of view.

In an alternative implementation, the field of view restriction is achieved by rendering one or more polygons in front of the camera that represent the "window" through which the virtual world should be visible. A filter is applied through standard graphics libraries (e.g. OpenGL) so that the virtual environment is only visible through the window. Similar to the aperture described above, this window can be scaled upwards or downwards using standard graphics transformations to increase or decrease the visible field of view.

In some head-mounted displays, it may be necessary to predistort the images in software prior to displaying them on screen, in order to correct for optical distortion introduced by the physical lens. One method of achieving this involves rendering the scene to a textured polygon or series of polygons in front of a virtual camera, and then applying a series of graphical transformations to warp the geometry in a way that cancels out the lens distortion. In this implementation, the field of view can be reduced by rendering opaque polygons between the render-to-texture polygons and the virtual camera, thereby occluding particular regions of the visual field. Alternatively, the texture coordinates for the render-to-texture polygons could be modified to prevent the virtual scene from being rendered on the regions that should be restricted from view.

Additionally, in a standard graphics pipeline, 3D virtual environments are eventually rendered to one or more 2D viewports. To manipulate the visible field of view, the color values of the individual pixels in these viewports can be altered or blacked out using a variety of methods, such as a lookup table, a series of rules (if/then statements), mathematical equations, and so forth. In this implementation, the correspondences of individual pixels to specific areas of the field-of-view will vary based on the technical specifications of the particular head-mounted display chosen.

Figure 5:
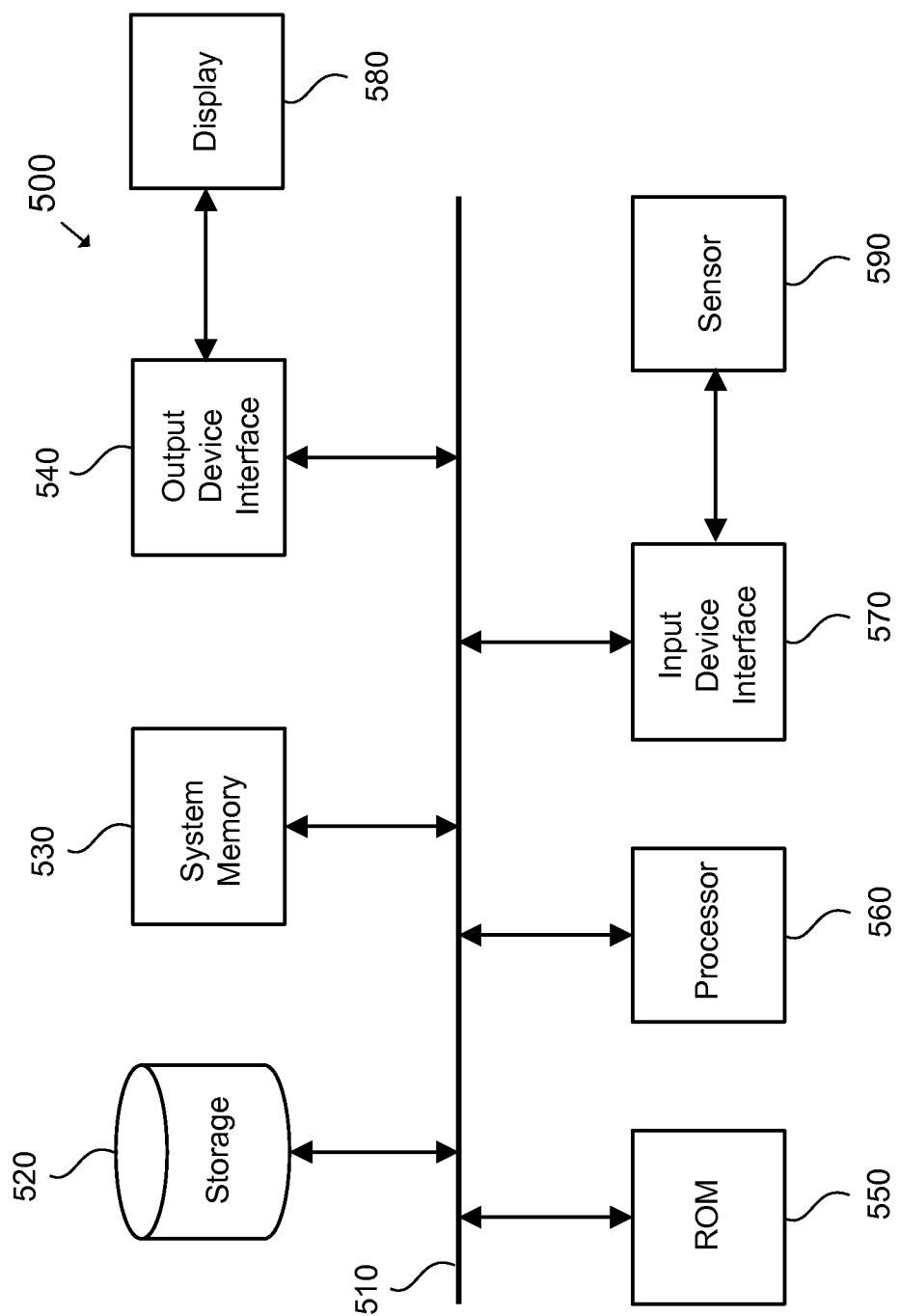
FIG. 5 illustrates a diagram of an electronic system according to example aspects of the present disclosure.

FIG. 5 conceptually illustrates an example computer system or electronic system with which some implementations of the subject technology can be implemented. Electronic system 500 can be a computer, phone, PDA, or any other sort of electronic device. The electronic system 500 may be integrated with a head mounted display, such as the HMD 110, may be partially integrated with the head mounted display, or may be external to and in communication with the head mounted display. Such an electronic system includes various types of computer readable media and interfaces for various other types of computer readable media. Electronic system 500 includes a bus 510, processing unit(s) 560, a system memory 530, a read-only memory (ROM) 550, a permanent storage device 520, an input device interface 570, an output device interface 540, a display 580, and a sensor 590.

The bus 510 collectively represents all system, peripheral, and chipset buses that communicatively connect the numerous internal devices of electronic system 500. For instance, the bus 510 communicatively connects the processing unit(s) 560 with the ROM 550, system memory 530, and permanent storage device 520. Portions of the bus 510 may be wireless.

From these various memory units, the processing unit(s) 560 retrieves instructions to execute and data to process in order to execute the processes of the present disclosure. The processing unit(s) 560 can be a single processor or a multi-core processor in different implementations.

The ROM 550 stores static data and instructions that are needed by the processing unit(s) 560 and other modules of the electronic system. The permanent storage device 520, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as the permanent storage device 520.

Other implementations use a removable storage device (for example, a floppy disk, flash drive, and its corresponding disk drive) as the permanent storage device 520. Like the permanent storage device 520, the system memory 530 is a read-and-write memory device. However, unlike the storage device 520, the system memory 530 is a volatile read-and-write memory, such as a random access memory. The system memory 530 stores some of the instructions and data that the processing unit(s) 560 needs at runtime. In some implementations, the processes of the present disclosure are stored in the system memory 530, the permanent storage device 520, or the ROM 550. For example, the various memory units include instructions for receiving user activity data and updating dimensions in accordance with some implementations. From these various memory units, the processing unit(s) 560 retrieves instructions to execute and data to process in order to execute the processes of some implementations.

The bus 510 also connects to input device interface 570 and output device interface 540. The input device interface 570 enables the user to communicate information and select commands to the electronic system. Input devices used with input device interface 570 include, for example, alphanumeric keyboards and pointing devices (also called "cursor control devices"). The sensor 590, which may correspond to the sensor 115, may be one or more sensors configured to detect a user state, such as physiological and other parameters as described above, and may be further configured as trackers for a head mounted display. The output device interface 540 enables, for example, the display of images generated by the electronic system 500. Output devices used with the output device interface 540 include, for example, printers and display devices, for example, cathode ray tubes (CRT) or liquid crystal displays (LCD), which may be used as a display for the head mounted display. Some implementations include devices, for example, a touchscreen that functions as both input and output devices.

Finally, the bus 510 also couples the electronic system 500 to a wired or wireless network (not shown). In this manner, the computer can be a part of a network of computers (for example, a local area network (LAN), a wide area network (WAN), or an Intranet, or a network of networks, for example, the Internet. Any or all components of electronic system 500 can be used in conjunction with the present disclosure.

Unless otherwise indicated, the devices and processes that have been discussed herein are implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various implementations to streamline the disclosure. This method of disclosure should not be interpreted as requiring claimed implementations to require more features than are expressly recited in each claim. Rather, as the following claims reflect, inventive subject matter lies in less than all features of a single disclosed implementation. Thus, the following claims are hereby incorporated into the detailed description, with each claim standing on its own as separately claimed subject matter.

The invention claimed is:

1. A non-transitory, tangible, computer-readable storage medium containing a program of instructions that cause a computer system running the program of instructions to
displaying an incoming image on a head-mounted display with a perimeter portion of the image being occluded on the display by the program of instructions; and
one or more of the following:
detect, using a sensor configured to monitor a user state in response to viewing the image, the user state, and dynamically throttle the amount of the occlusion in response to the user state being in an abnormal physiological state or an expected abnormal physiological state;
wherein the amount of the occlusion is manipulated by rendering the occluded portion to a textured polygon and manipulating the textured polygon;
wherein the amount of occlusion is based on one or more measurable parameters that include a virtual environment content, a system parameter, or a system performance;
wherein the amount of occlusion is based on an amount of elapsed time;
wherein the amount of occlusion is based on a user's previous virtual environment experience; or
wherein the amount of occlusion is based on influencing a user's experience with the virtual environment, influencing a task performance of the user, or completed tasks within the virtual environment.

2. The non-transitory, tangible, computer-readable storage medium of claim 1, wherein the program of instructions further causes the computer system to:
detect, using a sensor configured to monitor a user state in response to viewing the image, the user state; and
dynamically throttle the amount of the occlusion in response to the user state being in an abnormal physiological state or an expected abnormal physiological state.

3. The non-transitory, tangible, computer-readable storage medium of claim 1, wherein the occlusion includes an opaque polygon.

4. The non-transitory, tangible, computer-readable storage medium of claim 1, wherein the occlusion includes a screen mesh pattern.

5. The non-transitory, tangible, computer-readable storage medium of claim 1, wherein occlusion is symmetric.

6. The non-transitory, tangible, computer-readable storage medium of claim 1, wherein the occlusion is asymmetric.

7. The non-transitory, tangible, computer-readable storage medium of claim 1, wherein the amount of the occlusion is manipulated by rendering the occluded portion to a textured polygon and manipulating the textured polygon.

8. The non-transitory, tangible, computer-readable storage medium of claim 1, wherein the instructions detect, using a sensor configured to monitor a user state in response to viewing the image, the user state, and dynamically throttle the amount of the occlusion in response to the user state being in an abnormal physiological state or an expected abnormal physiological state, and the detecting the user state further comprises detecting, using the sensor, physiological measurements of the user.

9. The non-transitory, tangible, computer-readable storage medium of claim 1, wherein the instructions detect, using a sensor configured to monitor a user state in response to viewing the image, the user state, and dynamically throttle the amount of the occlusion in response to the user state being in an abnormal physiological state or an expected abnormal physiological state, and the sensor is further configured to detect at least one of a behavior of the user, a head and body posture of the user, and a cognitive state of the user.

10. The non-transitory, tangible, computer-readable storage medium of claim 1, wherein the amount of the occlusion is automatically throttled to prevent expected motion sickness.

11. The non-transitory, tangible, computer-readable storage medium of claim 1, wherein the amount of the occlusion is based on one or more measurable parameters that include a virtual environment content, a system parameter, or a system performance.

12. The non-transitory, tangible, computer-readable storage medium of claim 1, wherein the amount of the occlusion is based on an amount of time elapsed.

13. The non-transitory, tangible, computer-readable storage medium of claim 1, wherein the amount of the occlusion is based on a user's previous virtual environment experience.

14. The non-transitory, tangible, computer-readable storage medium of claim 1, wherein the amount of the occlusion is based on influencing a user's experience with the virtual environment, influencing a task performance of the user, or completed tasks within the virtual environment.

15. The non-transitory, tangible, computer-readable storage medium of claim 1, wherein the amount of occlusion is based on a user preference.

16. A method for displaying a virtual environment, the method comprising:
displaying, on a stereoscopic display, a field of view (FOV) of a virtual environment;
determining, based on historical data and a current user physiological state, a visual alteration to the extent of the FOV; and
rendering, on the stereoscopic display, the visual alteration to the extent of the FOV.

17. A virtual environment viewing device comprising:
a sensor for detecting physiological parameters; and
a stereoscopic display connected to the sensor and configured to display a field of view (FOV) of a virtual environment, wherein the extent of the FOV is visually altered based on the physiological parameters.

* * * * *